United States Patent [19]

Zimmermann et al.

[11] 4,295,551
[45] Oct. 20, 1981

[54] AUTOMATIC CLUTCH SYSTEM

[75] Inventors: Frank Zimmermann, Brunswick; Paulus Heidemeyer; Erhard Bigalke, both of Wolfsburg, all of Fed. Rep. of Germany

[73] Assignee: Volkswagenwerk Aktiengesellschaft, Wolfsburg, Fed. Rep. of Germany

[21] Appl. No.: 61,059

[22] Filed: Jul. 26, 1979

[30] Foreign Application Priority Data

Aug. 3, 1978 [DE] Fed. Rep. of Germany ....... 2833961

[51] Int. Cl.³ .............................................. B60K 41/02
[52] U.S. Cl. .................................. 192/0.076; 192/3.58; 74/866
[58] Field of Search ................ 192/30 W, 0.07, 0.075, 192/0.076, 0.052, 3.58, 3.59, 103 R, 103 F; 74/849, 859, 860, 865, 866, 877

[56] References Cited

U.S. PATENT DOCUMENTS

| 2,566,631 | 9/1951 | Price | 192/0.076 |
| 3,710,647 | 1/1973 | Dach et al. | 74/866 X |
| 3,752,011 | 8/1973 | Casey et al. | 74/866 X |
| 3,830,349 | 8/1974 | Williams | 192/103 F |
| 3,898,893 | 8/1975 | Hashimoto et al. | 74/866 X |
| 3,982,614 | 9/1976 | Bisaillon | 192/30 W |
| 4,019,614 | 4/1977 | Prenzel et al. | 192/3.58 |
| 4,072,220 | 2/1978 | Hamada | 192/3.59 |
| 4,081,065 | 3/1978 | Smyth et al. | 192/0.076 |
| 4,172,505 | 10/1979 | Rabus | 192/0.076 |

Primary Examiner—George H. Krizmanich
Attorney, Agent, or Firm—Brumbaugh, Graves, Donohue & Raymond

[57] ABSTRACT

An automatic clutch system is provided for use in a motor vehicle and has a control mechanism which responds to the position of the accelerator pedal and which also responds to first and second rotation speed sensing means connected to the engine shaft and the transmission shaft. In a preferred embodiment, the automatic clutch system is provided with a control mechanism which operates in a first mode when the vehicle is starting from a standing position to engage the clutch in a manner which keeps the engine in a specified speed range, which depends on accelerator lever position. The control mechanism operates in a second mode when the vehicle is shifted between gears in order to engage the clutch in a manner which provides a constant time gradient for the shaft speed difference selected in accordance with accelerator pedal position.

12 Claims, 7 Drawing Figures

PROGRAM CONDITIONS SUB-ROUTINE

AUTOMATIC CLUTCH SYSTEM

BACKGROUND OF THE INVENTION

This invention relates to an automatic clutch for a motor vehicle for use in connection with a manually shifted transmission for selectively connecting the output shaft of the vehicle engine to the input shaft of the transmission.

Automatic automobile clutches have been known in the prior art and usually make use of a pneumatic control motor. The motor is usually arranged to provide disengagement of the clutch through negative pressure action on the control motor. No especially high demands are made on the disengagement process, since prior to disengagement, the engine shaft and transmission shaft are operating at the same speed. Engagement of the clutch, on the other hand, which is usually effected through venting of the control motor must be effected as smoothly as possible to avoid intolerable shocks and jerks in the vehicle motion as the clutch is engaged. In one arrangement, the pneumatic control motor is used for actuation of the clutch only while the vehicle is moving, for shifting of the manually-operated transmission from one gear to the other. In this arrangement the venting of the control motor can occurs at a variable rate, which depends on the position of the accelerator pedal. For initially starting the vehicle in motion, however, a special centrifical clutch is provided to effect smooth engagement.

It is an object of the present invention to provide an automatic clutch arrangement which is capable of engaging the engine shaft to the transmission both during travel, upon changing of gears, and also during initial starting of vehicle motion, automatically and with a high degree of passenger comfort.

SUMMARY OF THE INVENTION

In accordance with the invention there is provided an automatic clutch system for use in a motor vehicle having an accelerator lever. The system is for selectively connecting the output shaft of a vehicle engine to the input shaft of a multi-speed transmission. The system includes a clutch mechanism, which is responsive to supplied control signals, for selectively connecting the shafts. There are provided first means for sensing the rotational speed of the engine shaft and second means for sensing the rotational speed of the transmission shaft. Third means are provided for sensing the position of the accelerator lever. Control means are provided which are responsive to the first, second and third sensing means for developing control signals for operating the clutch mechanism.

In a preferred embodiment of the invention, the control means has a first and second operating modes. The first operating mode is operative when the vehicle is accelerated from a stationary condition. According to the first mode, the control means activates the clutch mechanism to maintain the engine shaft speed within a selected speed range from a nominal engine speed function, which is determined as a function of accelerator lever position. The nominal engine speed function is preferably selected in accordance with a maximum tractive force curve and as a function of the accelerator lever position. In the second operating mode, operative when the vehicle is moving, the control means operates the clutch mechanism to reduce the speed difference between the engine shaft and the transmission shaft in accordance with a selected speed difference time gradient. The time gradient can be selected as a function of the accelerator lever position. The control means should be arranged to fully engage the clutch mechanism when the engine shaft and the transmission shaft have the same rotational speed. There may also be provided a timing mechanism which provides a special control signal when the shafts have unequal speed following a selected time interval after activation of the clutch mechanism indicating that full engagement of the automatic clutch has not yet occurred. This feature prevents continued operation of the vehicle with a partially engaged clutch, which can result in excess clutch wear. This condition may also be avoided by the use of a control means which provides a signal if the speed difference between the shafts has a time gradient which is less than a selected minimum value or if the temperature of portions of the clutch mechanism exceeds a specified value. These control signals may be used for providing an audible or visual alarm for signaling an abnormal condition of the automatic clutch or may be used to provide either engagement or disengagement of the automatic clutch. In a preferred version of the invention, the clutch mechanism includes first and second valves for connecting a clutch control motor with a source of vacuum pressure or with a vent according to the control signals provided by the control means.

The automatic clutch system in accordance with the invention provides different modes of operation during initial starting and gear shifting. The clutch mechanism is controlled during both of these operating conditions to function smoothly and efficiently in terms of engagement of the engine to the transmission. In addition, according to the preferred embodiments, there are provided means for disconnecting the clutch mechanism or fully connecting it, so that the clutch does not suffer damage which might arise out of a continuous partial engagement of the clutch mechanism. In the preferred embodiment the clutch mechanism includes pneumatic control valves which alternately engage or disengage the clutch according to signals supplied by the control means.

For a better understanding of the present invention, together with other and further objects, reference is made to the following description, taken in conjunction with the accompanying drawings, and its scope will be pointed out in the appended claims.

DESCRIPTION OF THE INVENTION

Figure 1:
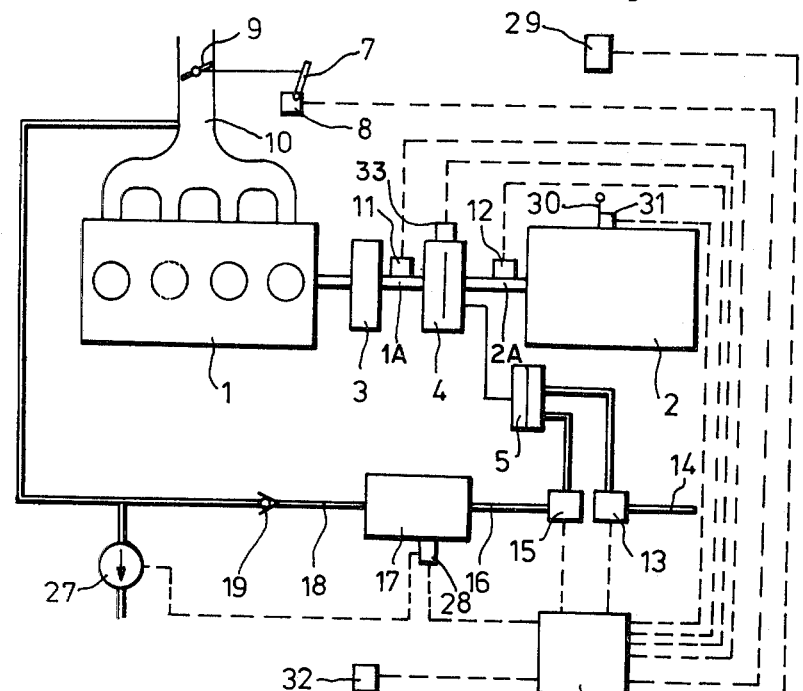
FIG. 1 is a schematic representation of a clutch system in accordance with the present invention.

FIG. 1 is a diagram which schematically illustrates the elements of a clutch mechanism in accordance with the present invention. The clutch mechanism is useful in a motor vehicle which includes a motor 1 which is connected to a transmission 2 by means of a flywheel 3 and a clutch 4. The transmission 2 is arranged to provide manual shifting between gears. In the system illustrated in FIG. 1, the clutch mechanism is not actuated by the usual foot pedal, but is engaged and disengaged alternatively by means of a control motor, such as pneumatic vacuum control motor 5.

Valves 13 and 15 are provided for operating pneumatic control motor 5 according to signals which are provided to the pneumatic valves 13 and 15 by control mechanism 6. Valves 13 and 15 alternately connect the control motor 5 with a vent 14 or with a vacuum line 16 which is connected to a vacuum pressure storage chamber 17. Chamber 17 is preferably connected over a vacuum line 18 with the suction intake manifold 10 of engine 1. The connection to the intake manifold is preferably arranged at a point which is after the throttle valve 9 in the direction of intake flow. A nonreturn valve 19 is provided for preventing reverse flow in vacuum line 18 during the times of low vacuum pressure in the intake manifold. Control mechanism 6 responds to signals which are representative of the position of the accelerator pedal 7 which operates throttle 9 as sensed by sensing mechanism 8. Control mechanism 6 also responds to signals supplied by sensing mechanisms 11 and 12 which sense the speed of rotation of the engine shaft 1A and transmission shaft 2A on opposite sides of the clutch 4.

The automatic clutch in accordance with the invention operates in two operating modes. The first operating mode is operative when the vehicle is in a standing position for the purpose of initially starting the vehicle motion. The second operating condition is effective on activation of the clutch when the vehicle is in motion in order to provide for shifting between transmission gears during operation of the vehicle. In both of these operating modes disengagement of the clutch is a non-critical condition, since disengagement takes place starting from a condition wherein both shafts have the same rotational speed. Engagement of the clutch is therefore the process which must be regulated by the use of motor 5, valves 13 and 15, and control mechanism 6.

Figure 2:
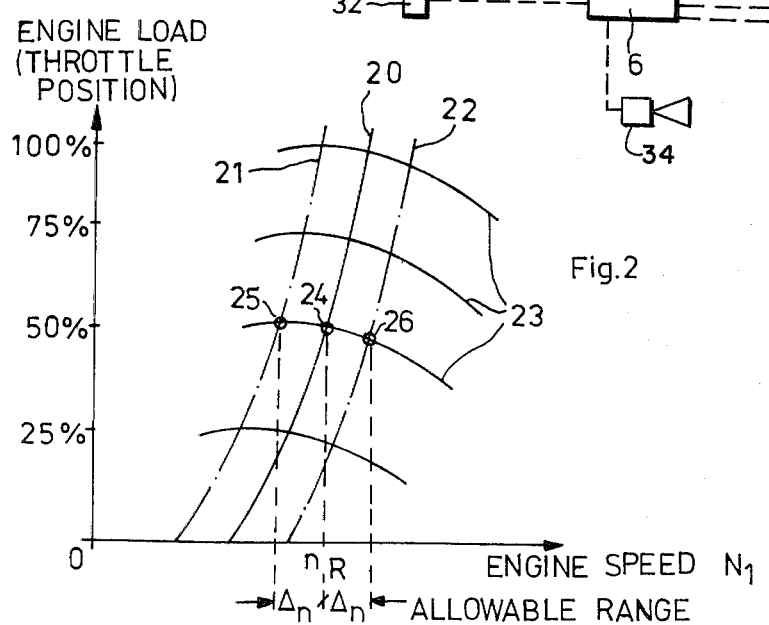
FIG. 2 is a graph illustrating engine speed as a function of engine load, measured by accelerator pedal position.

In the first clutch operating mode, when the vehicle is being initially started from a standing condition, clutch engagement is controlled so that the engine speed remains within a predetermined range of a speed which is selected according to the position of accelerator pedal 7. When engine speed exceeds the predetermined speed range, control mechanism 6 provides a signal to valve 13 which causes that valve to open to provide atmospheric pressure to control motor 5 thereby increasing the engagement of the clutch. When engine speed is below the predetermined speed range, the control mechanism 6 provides a signal to valve 15 which opens the valve and provides vacuum pressure to motor 5 causing a release of the engagement of the clutch mechanism and allowing an increase in engine speed. The speed range to be adhered upon the starting of the vehicle from a standing condition is suitably chosen to conform to the curve of maximum tractive force and maximum torque. This curve is illustrated in FIG. 2 as curve 20. Curves 21 and 22 represent curve 20 shifted in speed by a selected amount $\Delta n$ in a positive and a negative direction to provide a predetermined speed range within which the vehicle engine is to operate as a function of engine load.

As an example of the operation of the clutch mechanism of the present invention in the first mode, it is presumed that the vehicle is in a standing condition and the accelerator pedal is instantaneously depressed by one-half of its travel, which corresponds to one-half of the maximum engine load. The meshing of the automatic clutch is controlled by control mechanism 6 in a manner which keeps the engine speed within a value $\Delta n$ from the nominal speed condition $n_R$ indicated by point 24 in FIG. 2. The minimum and maximum engine speeds allowable under this condition are defined by curves 21 and 22, respectively. The automatic clutch mechanism starts from a condition of complete disengagement and the control motor 5 is initially supplied with atmospheric pressure through triggering of control valve 13 so that the clutch is displaced in the engagement direction. During this process, the engine speed initially tends to assume a high idling speed value corresponding to the half depressed condition of the accelerator. As the clutch 4 becomes engaged the engine is increasingly braked until the engine speed assumes the value illustrated by point 25 which is $n_R - \Delta n$. At this point the engine speed attempts to leave the predetermined speed range bounded by curves 21 and 22, and sensing this condition, control means 6 disconnects valve 13 and actuates valve 15 to cause the control motor 5 to be acted on by vacuum from vacuum storage 17 so that the clutch 4 is moved into a less engaged position. This process continues until the engine speed has increased along one of constant load curves 23 to the value $n_R + \Delta n$ because of the lower engine load. When the engine speed is $n_R + \Delta n$, corresponding to point 26 in the FIG. 2 graph, the control mechanism disconnects control valve 15 and reconnects control valve 13 to again increase clutch engagement and hence further load the engine. The process of alternating action on the control motor 5 by atmospheric pressure and vacuum causes an alternating engagement and disengagement of the clutch until the shaft speeds on either side of the clutch 4, as determined by sensing elements 11 and 12 are substantially the same. At this point, the clutch process is terminated and the vacuum actuation of the control motor 5 over control valve 15 is discontinued.

In the foregoing description it has been assumed that the control motor 5 engages the clutch in response to atmospheric pressure and disengages the clutch in response to vacuum pressure. Those skilled in the art will recognize that the opposite use of these two pressures for actuation of the clutch is also possible.

A principal advantage of the automatic clutch mechanism in accordance with the invention is that the clutch is always maintained in the range of the highest possible tractive forces in which the starting process can be carried out most effectively and within the shortest possible time.

In spite of the clutch actuation control which creates the optimum starting conditions, it is possible that because of an erroneously selected gear, the vehicle starting process cannot be terminated because the output of the engine, determined by the accelerator pedal is not sufficient to put the vehicle into motion at a speed corresponding to the selected gear. In this case, there are provided mechanism 33 to avoid overheating and damage of the clutch lining due to an overly extended clutch engagement process. Accordingly, the control device 6 terminates the clutch engagement process if, after a predetermined maximum time from the start of the clutch engagement process the speed difference sensed by speed sensing mechanisms 11 and 12 is not reduced to zero. An alternate criteria for terminating the clutch engagement process may consist in the value of the gradient of speed difference between the shafts as a function of time. If this gradient is below a predetermined value, the clutch engagement process can also be terminated. Another possible approach for preventing damage to the clutch lining is a measurement of the temperature of the clutch lining and termination of the clutch engagement process in the event a predetermined clutch lining temperature is exceeded. Any of these abnormal clutch operating conditions can provide a signal which causes either an alarm 34 to be provided, alerting the vehicle operator, or an abrupt termination of the clutch engagement process by full engagement or full disengagement of the clutch. Thus, the control means 6 can provide a signal which fully opens valve 15 to disengage the clutch or fully opens the valve 13 to fully engage the clutch. This process can be carried out over a selected time interval to prevent the abrupt reverse travel of a vehicle for example which is travelling up an incline. In addition to disengagement of the clutch, an alarm device 34 can be actuated which warns the driver that the clutch engagement process is being terminated or should be terminated because of the danger of damage to the clutch. This can cause the driver to select a more suitable gear for the vehicle operating condition. As an alternate to abrupt disengagement of the clutch it is possible to provide for an abrupt engagement of the clutch, in which case the engine would probably be stalled.

The second mode of clutch operation consists in the operation of the clutch while the vehicle is moving, for example when the transmission is shifted from one gear to another. Since this operation of the clutch is typically less demanding than clutch operation during initial starting, the alternating engagement and separation of the clutch is not necessary. In accordance with the invention, in the second mode the clutch engagement process is controlled to provide a predetermined time gradient of the rotational speed difference of the shaft rotational speed sensed before and after the clutch mechanism. The value of the time gradient of the rotational speed difference is variable according to the position of the accelerator pedal, so that at larger loads, corresponding to more depressed accelerator pedal, a greater time gradient is provided than a smaller load. The value of the rotational speed difference time gradient is obtained by a corresponding short time actuation of control valve 13 which brings about the venting of control motor 5 and a rapid and uniform engagement of the clutch can be achieved independent of the prevailing rotational speed.

In a variation of the design illustrated in FIG. 1, wherein the first and second control valves 13 and 15 are provided for acting on control motor 5 with negative pressure and atmospheric pressure respectively, those skilled in the art will recognize that it is possible to arrange a single, 3/2 control valve which can achieve both the venting of the control motor through connection with a vent and a negative pressure actuation through connection with the negative pressure reservoir according to the control signals provided.

The signals for the start of the clutch engagement and clutch disengagement may also be supplied by the position of the accelerator pedal and the gear shift lever. When the accelerator pedal is completely released or when the gear shift lever is moved into the neutral position, a signal for disengagement of the clutch can be provided, and when the accelerator pedal is again actuated out of the idling position, a signal for engagement of the clutch can be provided.

The arrangement of FIG. 1 also includes a vacuum pump 27 which is connected to operate in the event the pressure in storage vessel 17 is less than a predetermined vacuum level required to operate the clutch system, as determined by sensing element 28. Sensing element 28 is also connected to control device 6 to provide an indication of low pressure to that device.

A sensor 29 senses the position of the ignition switch, including whether the starter motor is activated, and provides a signal to control device 6 in accordance with the position of the ignition switch. Another sensing element 31 is provided in connection with the manual shift lever 30 in order to provide the control device 6 with an indication of whether a transmission control level has been touched and whether a particular gear is engaged. In a preferred embodiment sensor 31 provides an indication when the lever is in first gear, second gear or reverse gear, since initial starting engagement of the clutch will only be permitted when the transmission is one of these three gears. A hand operated switch 32 is also provided for generating a control signal to control element 6 to prevent automatic clutch disengagement when the accelerator pedal is released, thereby preventing free wheeling.

FIGS. 3A through 3F are flow diagrams illustrating a control program for use in a microprocessor to enable the microprocessor to perform the function of the control device 6. Those skilled in programming can easily write a program in accordance with the microprocessor selected to implement the steps of the flow diagrams contained in FIGS. 3A through 3F.

In the diagrams of FIG. 3, program subroutines are designated by doubly framed blocks, most of which are detailed in subsequent drawings. In FIG. 3A there is shown the main program flow routine, and an auxiliary interrupt program, which is periodically triggered to update measurement of engine shaft rotational speed $N_1$ and input transmission shaft speed $N_2$. The interrupt program has the capability to stop operation of the main program at periodic intervals, and to restart the main program at the point left off, when the measurement subroutines are completed.

Figure 3A:
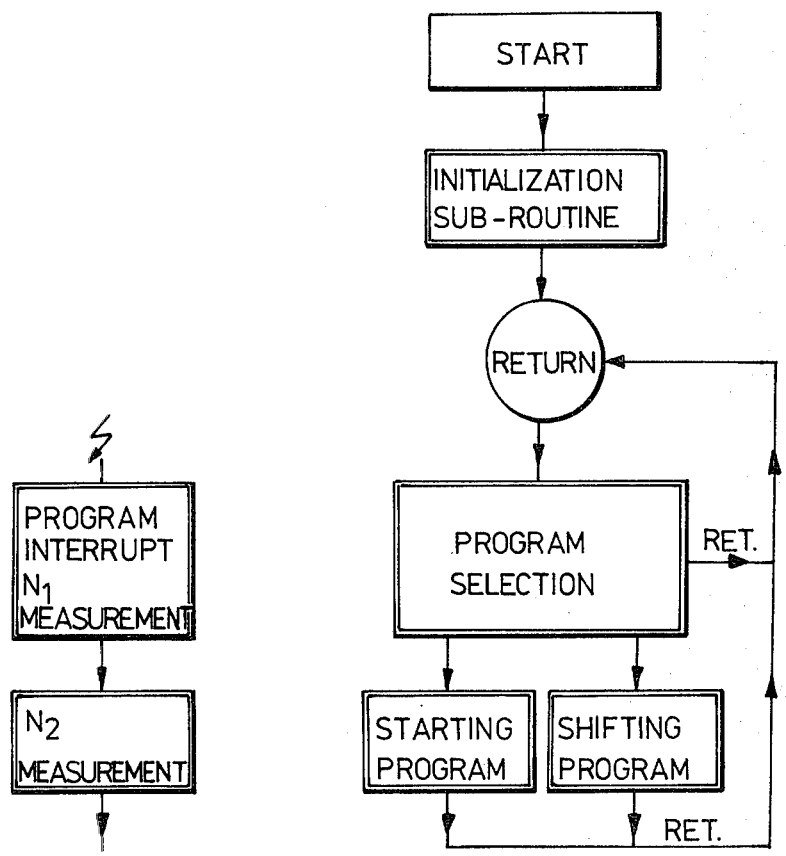
FIGS. 3A through 3F is a program flow diagram for use in the microprocessor control unit of the invention.

The main program illustrated on the right of FIG. 3A includes a program start, an initialization subroutine and a control loop which performs the principal operations of the control device. The initialization subroutine performs the function of setting initial values for program variables when operation is started by the application of power. This subroutine is well known for use in similar devices, and is not material to the scope of the present invention. Therefore the subroutine is not detailed in a flow diagram.

The principal program loop includes a program selection function, which controls the device to operate in either the starting mode or the shifting mode according to which subsequent subroutine is selected. These subroutines are alternately used to provide output control signals to valves 13 and 15. The program selection subroutine and the starting and shifting programs each have steps which cause the return of the logic flow to the start of the program loop. FIGS. 3B through 3F are detailed sketches of the decision logic use in the selection program, the shifting program, the starting program and subroutines contained in those programs. The following symbols are used for the parameters which are material to those programs.

$Z_2=1$: the ignition is connected;
$\overline{Z_3}=1$: the starter is not actuated;
PS=1: a given prescribed vacuum is present in the storage;
GS=1: the gear control lever has not been touched;

$N_L$: a minimum speed below which the clutch must be opened so as not to stall the engine;

$N_S$: the coasting speed which, as a function of the engine speed and the throttle valve angle, occurs when the engine is driven, e.g., on inclines, by the wheels by means of the transmission;

SS=0: the push-pull switch 32 is in a position in which the automatic disengagement of the clutch while the accelerator pedal is released is prevented;

K=1: the clutch is partially or fully disengaged;

K=0: the clutch is fully engaged;

H=1: the program conditions are set, i.e., the program conditions sub-routine has already been run setting constant H=1 and also setting constant S=1 or S=0, thereby to control the mode of clutch engagement and operate either the starting program or the shifting program;

H=0: the program conditions have not been set;

AS=1: the manual control lever 30 is not in a position corresponding to the first or second forward gear or the reverse gear;

$T_1$: is a pulse time for acting on the valves 13 or 15 for driving of the clutch control motor 5;

N': is a low speed, e.g., 200 rpm, such that when the vehicle is stopped, the clutch can be engaged without causing a jerk;

$K_1=0$: the valve 13 for engagement of the clutch is to be triggered;

$K_1=1$: the valve 15 for disengagement of the clutch is to be triggered;

$T_{1z}$: is a fixed pulse time for final locking of the clutch when the vehicle is stopped;

$T_{1A}$: is a fixed pulse time which is sufficient to effect a safe disengagement of the clutch;

$N_G$: limit rotational velocity, e.g., 700 or 900 rpm below which the starting program and above which the gear shift program are to be used;

$\alpha_{DK}$: throttle valve and accelerator pedal angles, respectively;

$\alpha_O$: throttle valve angle associated with cold running state;

ZM: is a numerical value representing the number of pulses emitted on clutch engagement from the start of the clutch engaging process on;

ZM=0: is set when the clutch engagement process starts;

$S_1=0$: condition for shifting program;

$S_1=1$: condition for the starting program;

$T_{1F}$: first fixed closing pulse which is to be sufficiently long so that the path of free movement of the clutch is overcome;

ZK: minimum pulse number which must be attained only before the clutch closing process can be terminated;

$T_F$: continuous time which starts when the last actuation pulse has been put out;

$T_V$: fixedly preset pulse spacing;

DNN: difference between engine shaft speed and transmission input shaft speed (instantaneous value);

DDN: difference of speed differentials;

DNA: old value of speed differentials which was determinated when the preceding pulse was put out;

X: fixed stored value for DDN=0 or depending on throttle angle $T_{1D}$: value of pulse time for triggering (driving) of the valve 13 which is a function of the speed differential;

$T_{1O}$: fixed pulse time for triggering of the valve 15 (open clutch) in order to avoid jerking;

ZM+1: program counter is increased by one step;

T: continuous time which starts to run as the starting program starts;

$T_{Ab}$: time, dependent, e.g., upon the engine output, after which the starting program must be discontinued for reasons of safety, e.g., in order to prevent overheating of the clutch;

$N_{R+} = n_R + \Delta n$: prescribed value for engine speed per FIG. 2 plus band width;

$N_{R-} = n_R - \Delta n$: prescribed value for engine speed per FIG. 2 less band width;

$T_{1R}$: fixed pulse time for opening or closing clutch;

$T_{1S}$: fixed pulse time which is sufficient for safe (certain) final closing of clutch.

Figure 3B:
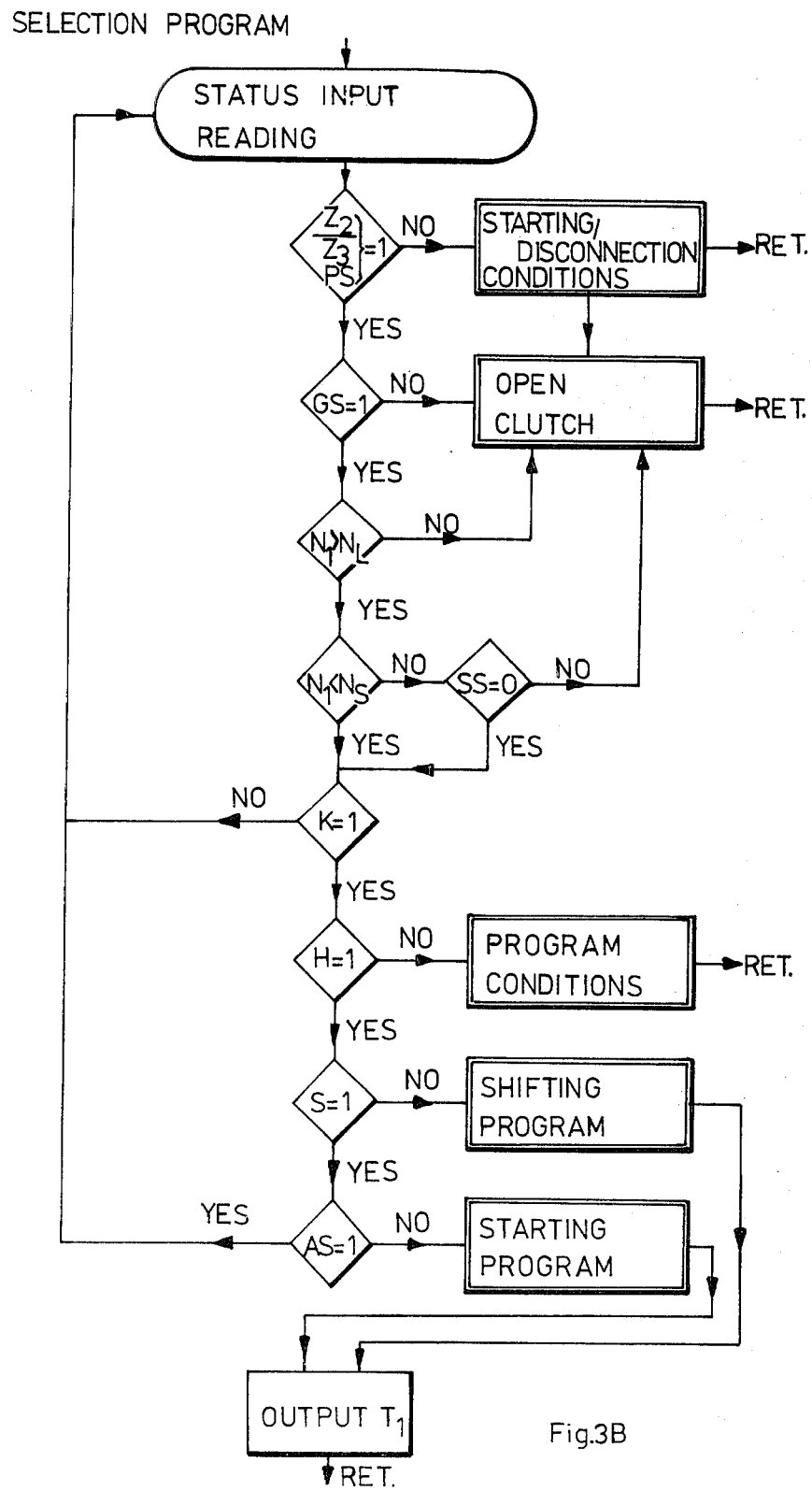

The overall arrangement of the program selection subroutine is shown in FIG. 3B. At the start of this subroutine the outputs of the various status sensors, which provide inputs to the microprocessor are sensed, and the corresponding values are stored in appropriate memory locations in the microprocessor circuit. Following this initial input, decisions are made concerning the ignition switch, the starter, the vacuum pressure available. In the event the ignition is off, the starter is being operated or there is insufficient vacuum, the program proceeds to the starting/disconnection conditions subroutine shown at the top of FIG. 3C. Program operation is delayed by return to start if there is insufficient vacuum pressure, the open clutch routine is activated in the event the starter motor is being operated, and, in the final alternative, the clutch is fully engaged if the ignition switch is off and the engine speed is below a minimum value.

Referring again to FIG. 3B, in the event the gear shift lever has been operated or the engine speed is below a minimum idle speed and tending to stall, the open clutch subroutine shown at the bottom of FIG. 3C will be activated. This routine will also be activated if the vehicle engine is being driven by the wheels and the manual control to prevent freewheeling has not been closed.

The next program decision is whether the clutch is opened as determined by the value of K. If the clutch is open, the program proceeds to determine whether H has been set by a previous operation of the program conditions sub-routine. If H=1, one of the clutch engagement programs is operated according to the value of S. Operation of the starting program is prevented if the transmission is not in first, second or reverse gear.

Figure 3C:
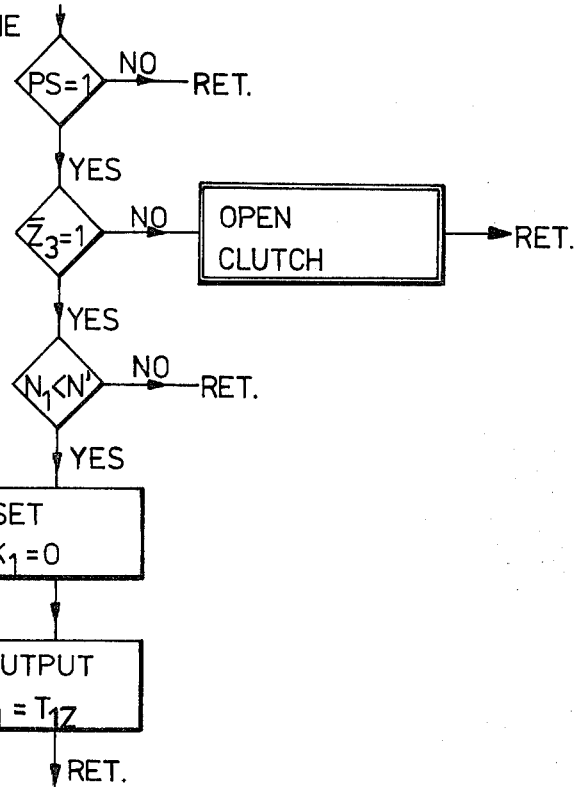
Figure 3C:
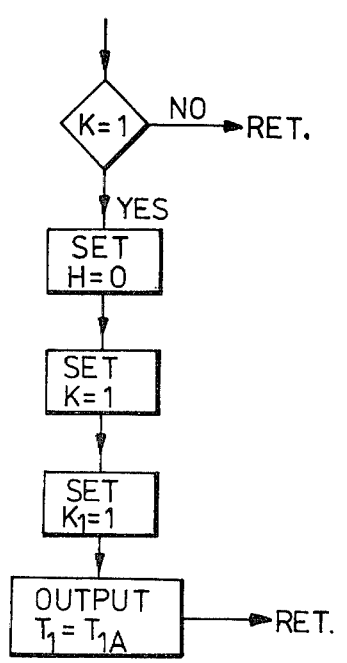
Figure 3D:
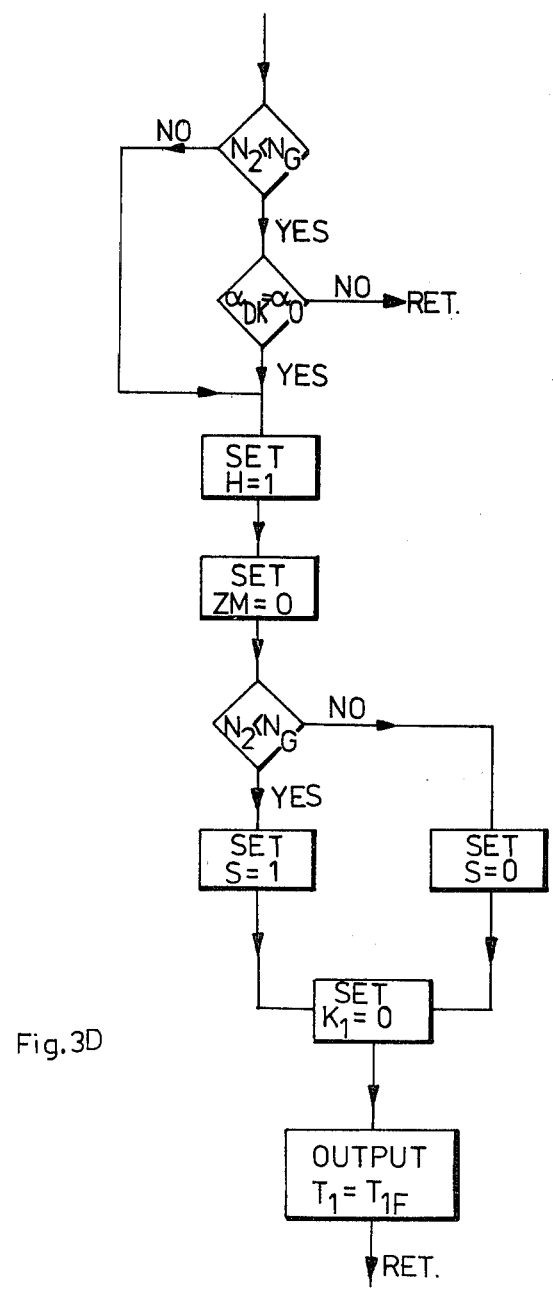

Assuming that the program conditions subroutine has not been operated, i.e. H=0, the program conditions sub-routine of FIG. 3D is operated. This routine determines whether the vehicle is operating from a standing, or very slow moving, condition, or being shifted while moving, and sets the value of S accordingly to operate the shifting or starting program according to whether the control device 6 is to operate in the first or second mode. This is determined by the transmission shaft speed N2. This routine also responds to the accelerator position to prevent clutch engagement for a released accelerator when operating in the starting mode and sets the value of H and the program count ZM. This subroutine also provides an output for the initiation of clutch engagement by providing valve 13 with a triggering pulse of sufficient duration to take up the slack in the clutch.

Figure 3E:
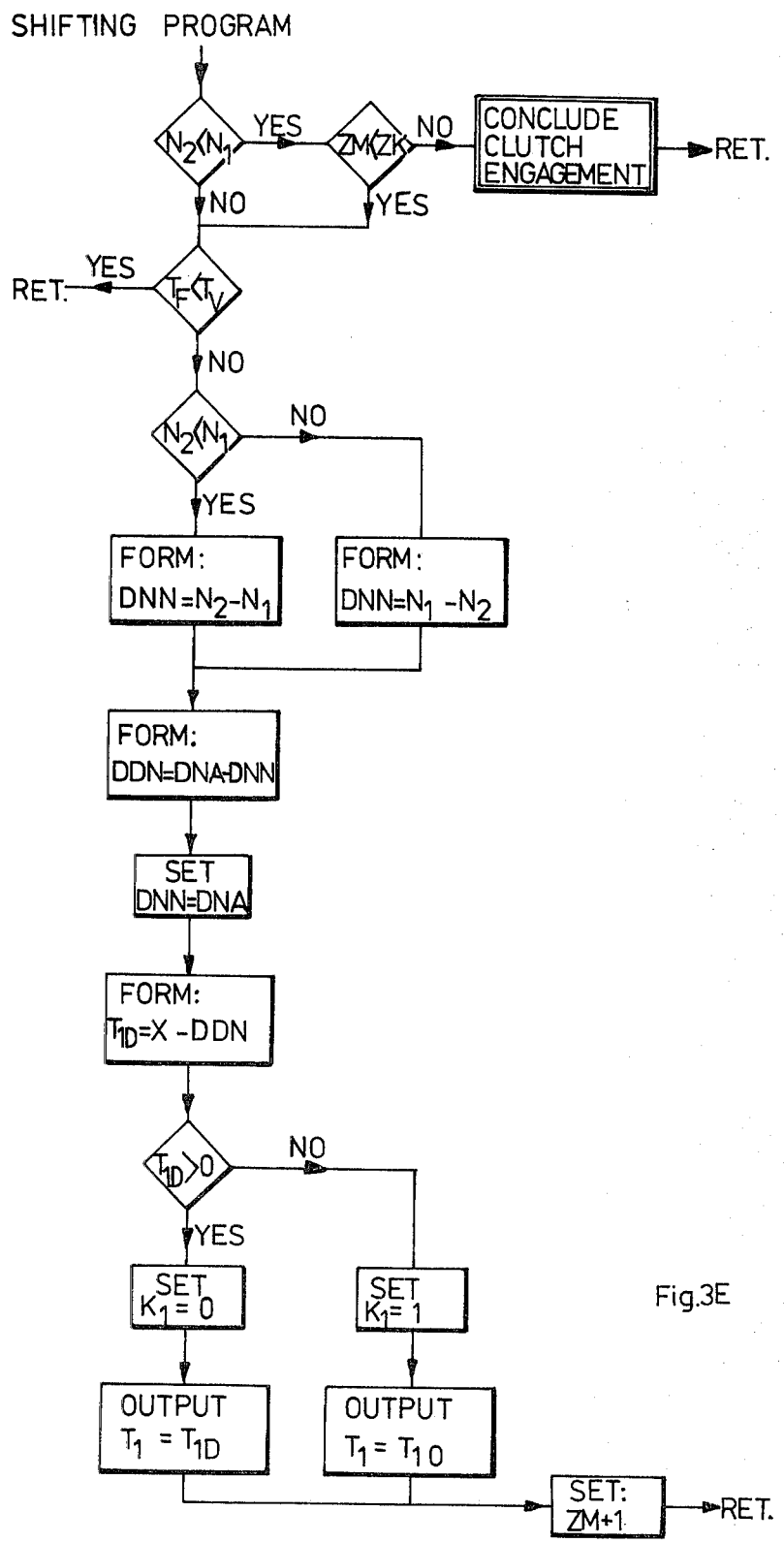

After initial operation of the program condition subroutine, this program is bypassed until the clutch is again opened by the open clutch subroutine in FIG. 3C, which resets H=0. The shifting clutch-engagement program is shown in FIG. 3E. This program forms a difference value DNN which is equivalent to the differential speed of the engine shaft and transmission input shaft. The change in this differential speed since the last operation of the routine is calculated to obtain the time gradient of the speed differential, and this value is used to regulate the engagement of the clutch according to a routine which tends to maintain a constant speed differential gradient.

Figure 3F:
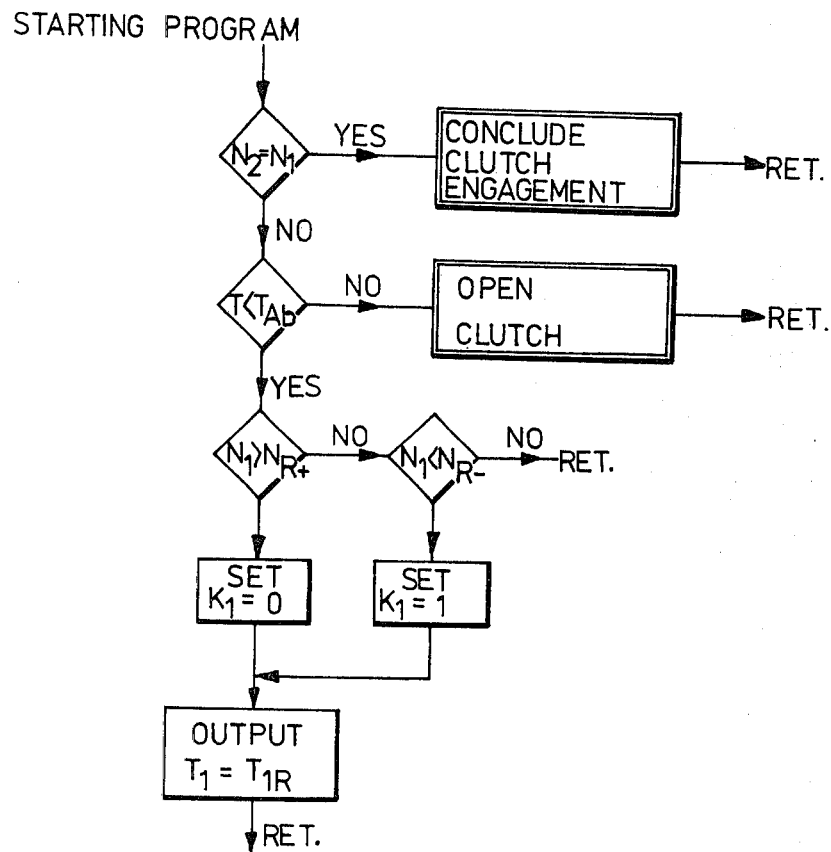
Figure 3F:
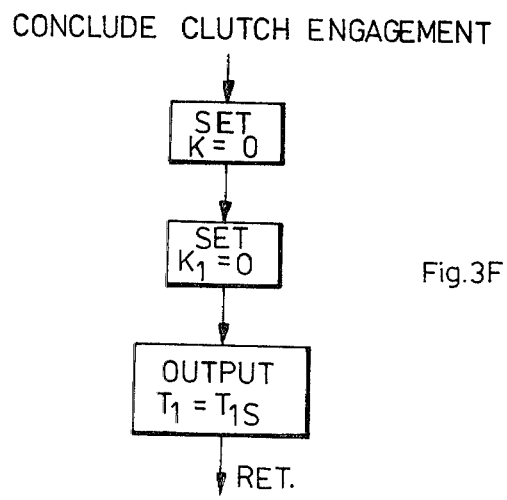

The clutch control program for initial starting is shown at the top of FIG. 3F. This program includes a time comparison to determine whether an overly extended clutch engagement process is taking place, and also includes a comparison of the engine speed and the selected range of permissible engine speeds which are determined in accordance with the accelerator throttle position according to the FIG. 2 graph. According to the engine speed, the clutch is either opened or closed to maintin approximately the desired speed.

Those skilled in the art will recognize that the various steps in the program can be changed or modified to a significant extent while maintaining the general characteristics of the invention. It should be further recognized that other program steps may be included which will perform the various modifications of the control modes in accordance with the invention.

While there have been described what are believed to be the preferred embodiments of the invention, those skilled in the art will recognize that other and further changes may be made thereto without departing from the spirit of the invention, and it is intended to claim all such changes and modifications as fall within the true scope of the invention.

We claim:

1. An automatic clutch system, for use in a motor vehicle having an accelerator lever, for selectively connecting the output shaft of a vehicle engine to the input shaft of a multi-speed transmission, comprising:
a clutch mechanism, responsive to supplied signals, for selectively connecting said shafts;
first means for sensing the rotational speed of said engine shaft,
second means for sensing the rotational speed of said transmission shaft;
third means for sensing the position of said accelerator lever;
and control means, responsive to said first, second and third sensing means, for developing said control signals, said control means having a first operating mode, operative when said vehicle is accelerated from a stationary condition, and wherein said control means activates said clutch mechanism in said first mode to maintain said engine shaft speed within a selected speed range from a selected nominal engine speed function and wherein said nominal engine speed function is determined as a function of said accelerator lever position.

2. An automatic clutch as specified in claim 1, wherein said nominal engine speed function is selected in accordance with a maximum tractive force curve and as a function of said accelerator lever position.

3. An automatic clutch as specified in claim 1, wherein said control device has a second operating mode, operative when said vehicle is moving, and wherein said control means operates said clutch mechanism to reduce the speed difference between said shafts in accordance with a selected speed difference time gradient.

4. An automatic clutch as specified in claim 3, wherein said speed difference time gradient is selected as a function of said accelerator lever position.

5. An automatic clutch as specified in any one of claims 1 to 4, wherein said control means is arranged to fully engage said clutch mechanism when said shafts have the same rotational speed.

6. An automatic clutch as specified in claim 1, wherein said control means includes timing means and is arranged to provide a special control signal when said shafts have unequal speed following a selected time interval after activation of said clutch mechanism.

7. An automatic clutch as specified in claim 1, wherein said control means is arranged to provide a special control signal if the speed difference between said shafts has a time gradient which is less than a selected value.

8. An automatic clutch as specified in claim 1, wherein there are provided means, responsive to the temperature of portions of said clutch mechanism, for providing a special control signal.

9. An automatic clutch as specified in claim 6, 7 or 8, wherein there are provided alarm means responsive to said special control signal for signaling an abnormal condition.

10. An automatic clutch as specified in claim 6, 7 or 8, wherein said control means includes means, responsive to said special control signal, for fully disengaging said clutch mechanism.

11. An automatic clutch as specified in claim 6, 7 or 8, wherein said control means includes means, responsive to said special control signal, for fully engaging said clutch mechanism.

12. An automatic clutch as specified in any of claims 1 to 4 wherein said clutch mechanism includes a first valve connecting a clutch control motor with a source of vacuum pressure, a second valve connecting said clutch control motor with a vent, and wherein said valves are responsive to said control signals.

* * * * *